(12) United States Patent
Lee et al.

(10) Patent No.: US 7,826,964 B2
(45) Date of Patent: Nov. 2, 2010

(54) INTELLIGENT DRIVING SAFETY MONITORING SYSTEM AND METHOD INTEGRATING MULTIPLE DIRECTION INFORMATION

(75) Inventors: Jiann-Der Lee, Taoyuan Hsien (TW); Li-Chang Liu, Taipei (TW); Jiann-Der Li, Taichung (TW)

(73) Assignee: Chang Gung University, Tao-Yuan (TW)

( * ) Notice: Subject to any disclaimer, the term of this patent is extended or adjusted under 35 U.S.C. 154(b) by 654 days.

(21) Appl. No.: 11/902,140

(22) Filed: Sep. 19, 2007

(65) Prior Publication Data

US 2008/0230297 A1      Sep. 25, 2008

(30) Foreign Application Priority Data

Mar. 22, 2007    (TW)    ............................... 96109955 A

(51) Int. Cl.
*G06F 19/00*    (2006.01)
(52) U.S. Cl. .................................................... 701/116
(58) Field of Classification Search ................ 701/1, 701/45, 116, 117, 301; 340/425.5, 426.15, 340/436, 437, 901; 348/148, 169; 180/271
See application file for complete search history.

(56) References Cited

U.S. PATENT DOCUMENTS 6,272,431 B1 *   8/2001   Zamojdo et al. ............ 701/211
7,500,769 B2 *   3/2009   Kaiba ......................... 362/465

OTHER PUBLICATIONS

Jiann-Der Lee et al., A Novel Drive Status Monitoring System, 2006 IEEE Conference Systems, Man, and Cybernetics Oct. 8-11, 2006, Taipei, Taiwan, pp. 4643-4647.

* cited by examiner

*Primary Examiner*—Kim T Nguyen
(74) *Attorney, Agent, or Firm*—Pillsbury Winthrop Shaw Pittman, LLP

(57) ABSTRACT

An intelligent driving safety monitoring system capable of integrating multiple direction information is adapted to be installed in a vehicle. The system includes a first image capturing device, a second image capturing device, a data processing device, and an indicating device. The first image capturing device is used to capture a face image of a driver of the vehicle. The second image capturing device is used to capture a front lane image. The data processing device, after doing computations based on the face image of the driver and the front lane image, maps a sight direction of the driver and a mid-line of lane into a global coordinate space and integrates the same into multiple direction information. The indicating device outputs the multiple direction information to the driver for suggesting whether driving status of the driver is safe.

30 Claims, 18 Drawing Sheets

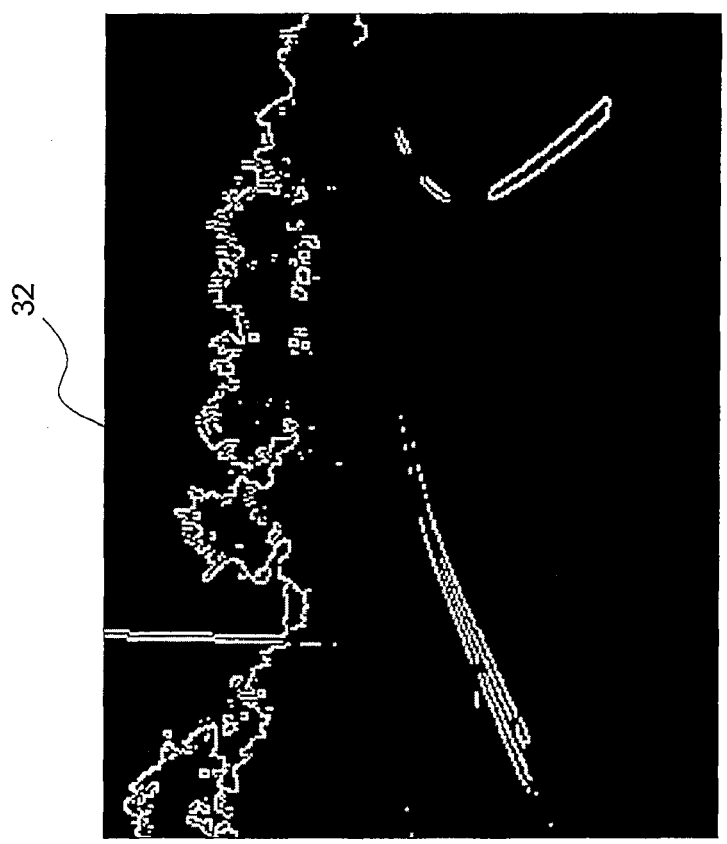
F I G 6B

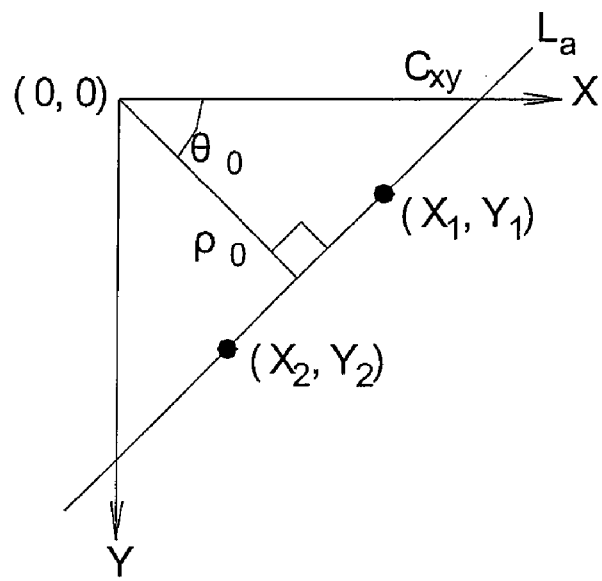
F I G 9A
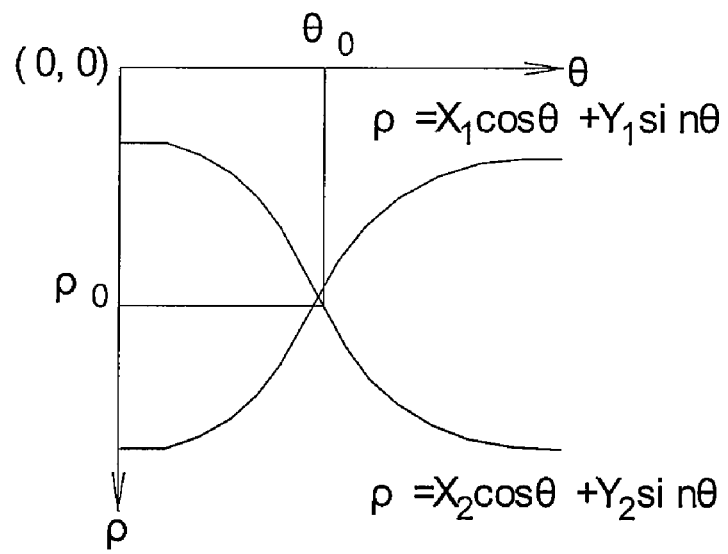
F I G 9B

F I G 12A

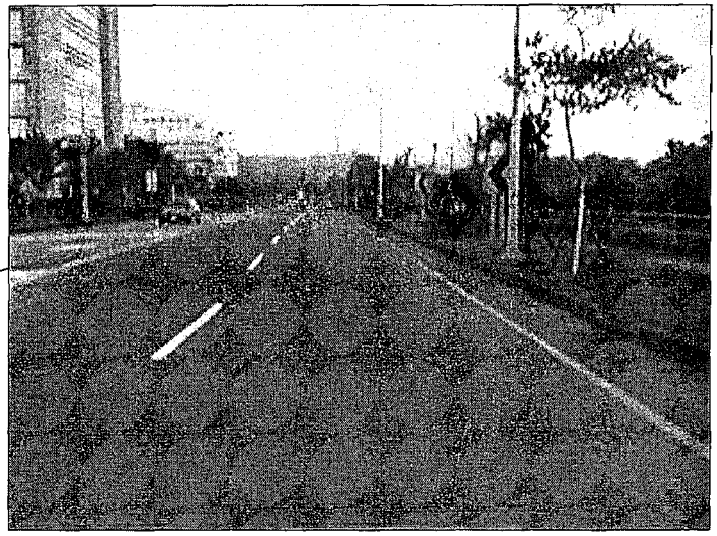
F I G 12B

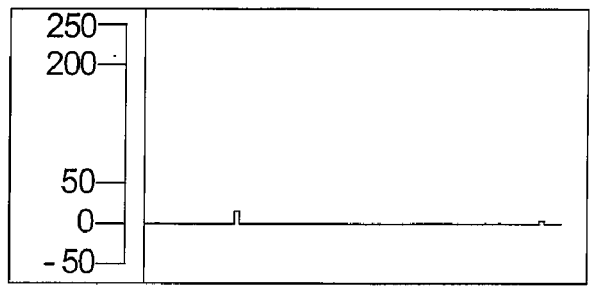
F I G 13A
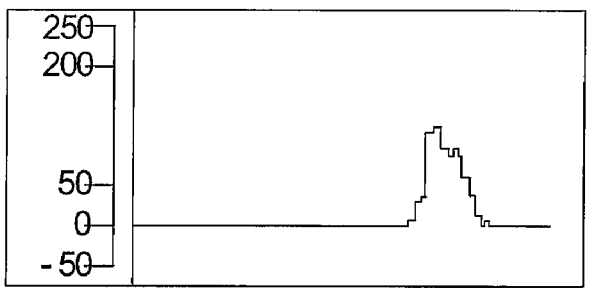
F I G 13B
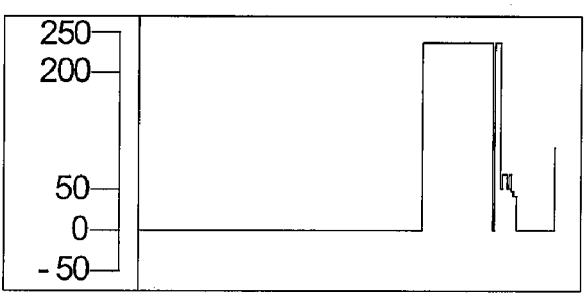
F I G 13C
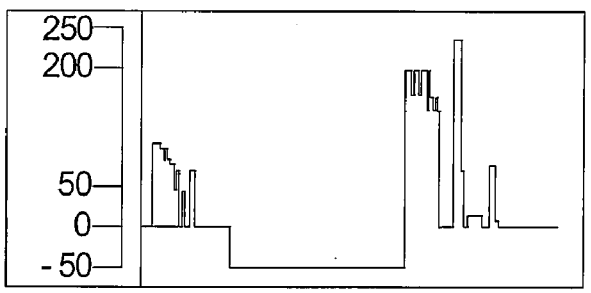
F I G 13D

INTELLIGENT DRIVING SAFETY MONITORING SYSTEM AND METHOD INTEGRATING MULTIPLE DIRECTION INFORMATION

CROSS-REFERENCE TO RELATED APPLICATION

This application claims priority of Taiwanese Application No. 096109955, filed on Mar. 22, 2007.

BACKGROUND OF THE INVENTION

1. Field of the Invention

The invention relates to a driving monitoring system and method, more particularly to an intelligent driving safety monitoring system and method that integrates multiple direction information to determine a current driving mode.

2. Description of the Related Art

Intelligent transportation systems (ITS) employ techniques that integrate technologies in the fields of control, information, communications and transmission. Current researches on intelligent vehicles generally include enhancing power of vehicles and assisting steering systems to enhance the dynamic performance thereof, and integrating electronic techniques and information processing to create added values of safety services, such as auto-tracking systems and anti-collision systems, or to establish digital network systems in vehicles.

However, current intelligent vehicles are largely focused on analysis of a single piece of information, like using laser beams to obtain information of distance from neighboring vehicles, or using a camera to capture images of a front vehicle so as to obtain information of calculated distance from the front vehicle, or determining whether a moving vehicle has deviated from its current path. Nonetheless, these systems fail to consider integrating the driver's driving information, and therefore cannot accurately characterize the extent to which the driver has his/her car under control. For instance, when a car deviates to the right from the current path, it does not necessarily mean danger, because the driver may simply want to drive to the shoulder of the road to inspect his/her car.

SUMMARY OF THE INVENTION

Therefore, the object of the present invention is to provide an intelligent driving safety monitoring system and method that integrate multiple direction information.

Accordingly, the intelligent driving safety monitoring system that integrates multiple direction information of the present invention is adapted to be installed in a vehicle, and includes a first image capturing device, a second image capturing device, a data processing device, and an indicating device.

The first image capturing device is used to capture a face image of a driver of the vehicle. The second image capturing device is used to capture a front lane image of a portion of a lane ahead of the vehicle. The data processing device, after doing computations based on the face image and the front lane image, maps a sight direction of the driver and a mid-line of lane into a global coordinate space, and integrates the same into multiple direction information. The indicating device outputs the multiple direction information to the driver for suggesting whether driving status of the driver is safe.

The intelligent driving safety monitoring method that integrates multiple direction information of the present invention is adapted for use in a vehicle, and includes the following steps: (a) capturing a face image of a driver of the vehicle; (b) capturing a front lane image of a portion of a lane ahead of the vehicle; (c) after computing the face image of the driver and the front lane image, mapping a sight direction of the driver and a mid-line of lane into a global coordinate space and integrating the same into multiple direction information; and (d) providing the multiple direction information to the driver for suggesting whether driving status of the driver is safe.

The levels of application provided by the intelligent driving safety monitoring system and method integrating multiple direction information of the present invention for the driver's reference include:

1. Information of the driving direction, the mid-line of lane and the sight direction of the driver can be integrated for display on a screen;

2. Multiple direction information, such as the lane correlation coefficient $C_{Lane}$, the driver correlation coefficient $C_{Driver}$, or the driving danger coefficient $C_{Danger}$ calculated from the lane correlation coefficient and the driver correlation coefficient, can be computed. The driving status of the driver is further determined to be a safe mode, a risky mode or a dangerous mode according to the coefficients; and 3. According to the lane correlation coefficient $C_{Lane}$, the current road situation can be determined to be a straight lane, a curved lane, a bend, or a lane change.

BRIEF DESCRIPTION OF THE DRAWINGS

Other features and advantages of the present invention will become apparent in the following detailed description of the preferred embodiment with reference to the accompanying drawings, of which:

FIGS. 6A and 6B are schematic diagrams to respectively illustrate a front lane image and an edge detected image obtained by subjecting the front lane image to edge detection processing;

FIGS. 9A and 9B are schematic diagrams to illustrate the principle of a Hough transform employed by a straight line detecting module of the preferred embodiment;

FIGS. 12A, 12B and 12C respectively illustrate an image of a driver and a front lane image inputted into the system of the preferred embodiment for computation processing and a global coordinate plot divided into ten bins;

FIGS. 13A, 13B, 13C, and 13D respectively are a lane correlation coefficient $C_{Lane}$ distribution diagram when driving on a straight lane, a lane correlation coefficient $C_{Lane}$ distribution diagram when driving from the straight lane into a curved lane, a lane correlation coefficient $C_{Lane}$ distribution diagram when changing lanes, and a lane correlation coefficient $C_{Lane}$ distribution diagram when driving on a curved lane.

DETAILED DESCRIPTION OF THE PREFERRED EMBODIMENT

Figure 1:
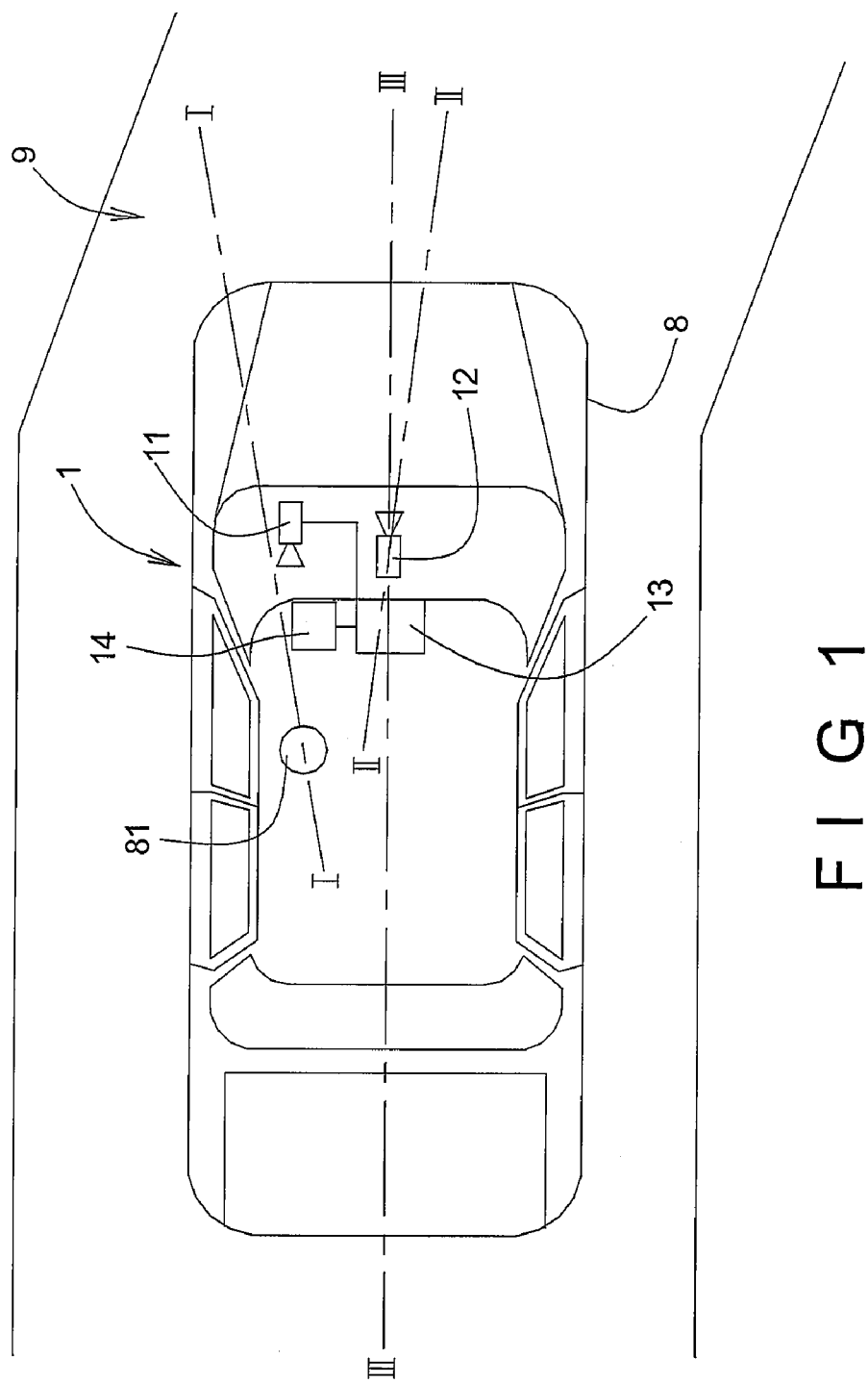
FIG. 1 is a schematic diagram to illustrate a preferred embodiment of an intelligent driving safety monitoring system capable of integrating multiple direction information according to the present invention when installed in a vehicle.
Figure 2:
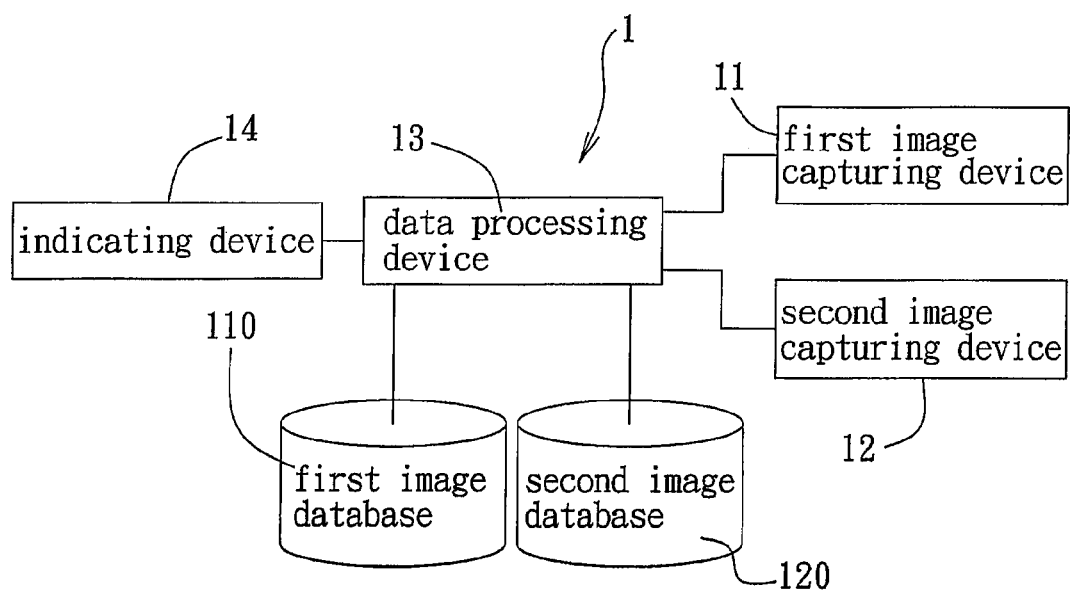
FIG. 2 is a system block diagram to illustrate components of the preferred embodiment.

Referring to FIGS. 1 and 2, the preferred embodiment of an intelligent driving safety monitoring system 1 integrating multiple direction information according to the present invention is shown to be installed in a vehicle 8 of a driver 81. The intelligent driving safety monitoring system 1 includes a first image capturing device 11, a first image database 110, a second image capturing device 12, a second image database 120, a data processing device 13, and an indicating device 14.

The intelligent driving safety monitoring system 1 executes a method that includes the following steps: Initially, when the vehicle 8 starts to move, the first image capturing device 11 captures a face image of the driver 81 that is stored in the first image database 110, and the second image capturing device 12 captures a front lane image of a portion of a current lane 9 ahead of the vehicle 8 that is stored in the second image database 120.

Figure 3:
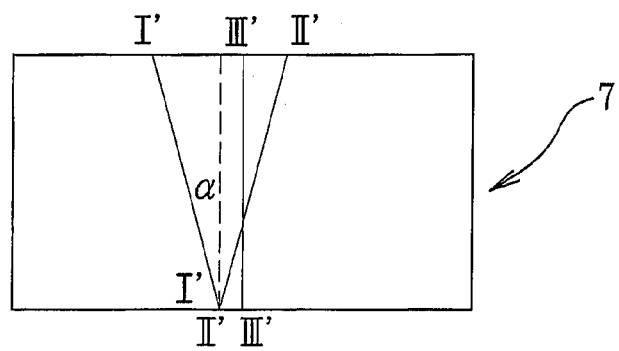
FIG. 3 is a schematic diagram to illustrate how a sight direction of a vehicle driver, a mid-line of lane and a driving direction are mapped into a global coordinate space after computation processing in the preferred embodiment.

With reference to FIG. 3, the data processing device 13 processes the face image of the driver 81 and the captured front lane image, maps a sight direction I-I of the driver 81, a mid-line of lane II-II, and a driving direction III'-III' into a global coordinate space 7, and integrates the same into multiple direction information (to be described hereinafter), such as a lane correlation coefficient $C_{Lane}$ or a driver correlation coefficient $C_{Driver}$. The indicating device 14 is a display device used to display the multiple direction information to the driver 81 for reference and for suggesting whether his/her driving status is safe. The indicating device 14 may alternatively be an alarm device in other embodiments of this invention.

Figure 4:
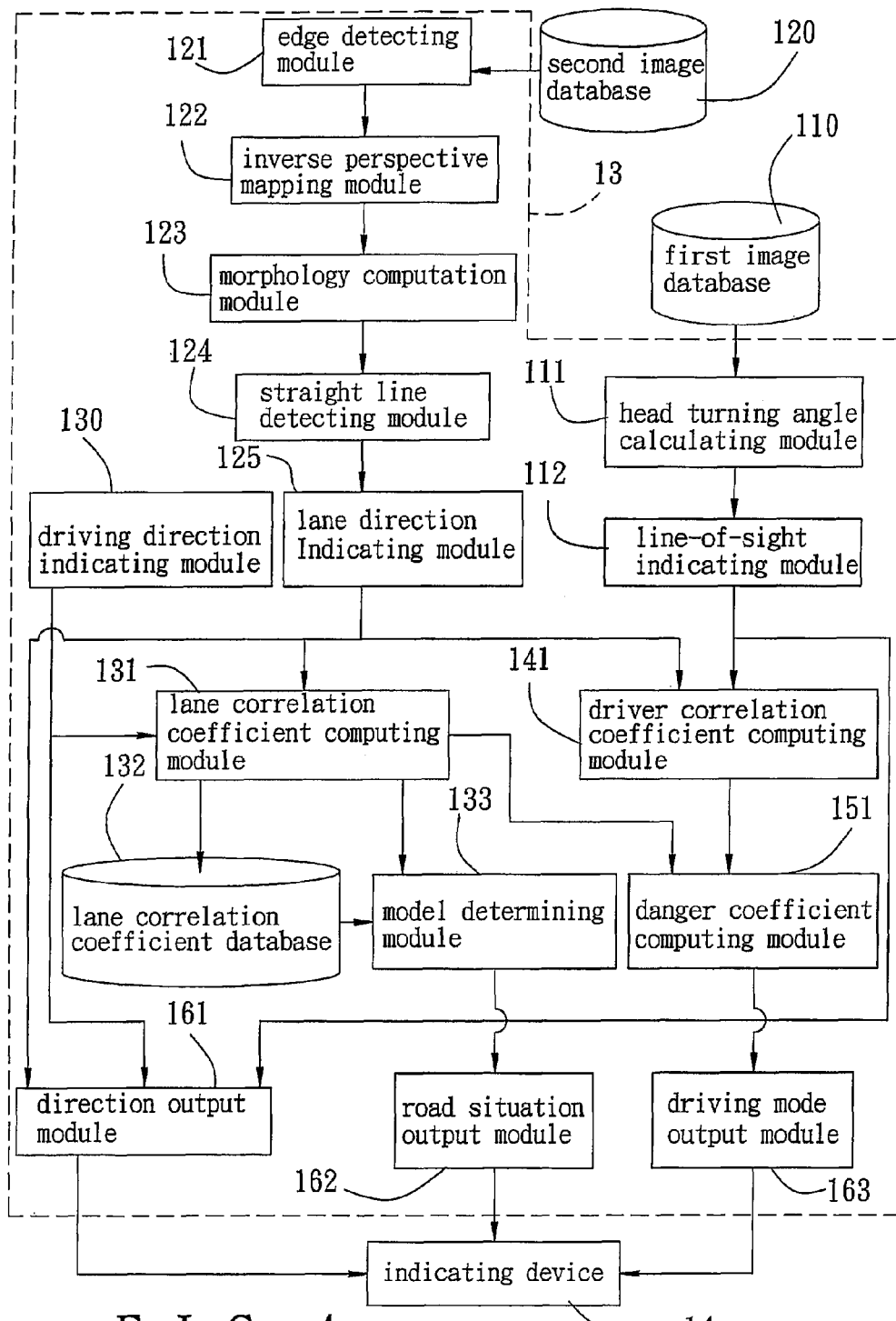
FIG. 4 is a system block diagram to illustrate a data processing device of the preferred embodiment.

Referring to FIGS. 1 and 3, the sight direction I-I of the driver 81 and the mid-line of lane II-II are computed, and a computed sight direction I'-I' and a computed mid-line of lane II'-II' are integrated into the global coordinate space 7. Since the second image capturing device 12 is disposed in a longitudinal direction III-III defined by the vehicle 8, the longitudinal direction III-III is mapped into the global coordinate space 7 as the driving direction III'-III'. It is noted that, in the global coordinate space 7 shown in FIG. 3, the starting point of the mid-line of lane II'-II' does not necessarily coincide with the starting point of the driving direction III'-III'. Referring to FIG. 4, the data processing device 13 includes a head turning angle calculating module 111, a line-of-sight indicating module 112, an edge detecting module 121, an inverse perspective mapping module 122, a morphology computation module 123, a straight line detecting module 124, a mid-line of lane indicating module 125, a driving direction indicating module 130, a lane correlation coefficient computing module 131, a lane correlation coefficient database 132, a model determining module 133, a driver correlation coefficient computing module 141, a danger coefficient computing module 151, a direction output module 161, a road situation output module 162, and a driving mode output module 163.

The driving direction indicating module 130 indicates the driving direction III'-III' (see FIG. 3) in the global coordinate space 7. In this preferred embodiment, the driving direction III'-III' is directly defined to be disposed on a central axis. The line-of-sight indicating module 112 integrates the sight direction I'-I' (see FIG. 3) obtained by computation into the global coordinate space 7. Similarly, the mid-line of lane indicating module 125 indicates the mid-line of lane II'-II' obtained by computation in the global coordinate space 7. The method of integration is to transmit the information of the aforesaid sight direction I'-I', the mid-line of lane II'-II', and the driving direction III'-III' to the direction output module 161 together. The direction output module 161 finally outputs multiple direction information integrating the aforesaid direction information.

(I) Acquisition of the Driver's Sight Direction

Figure 5:
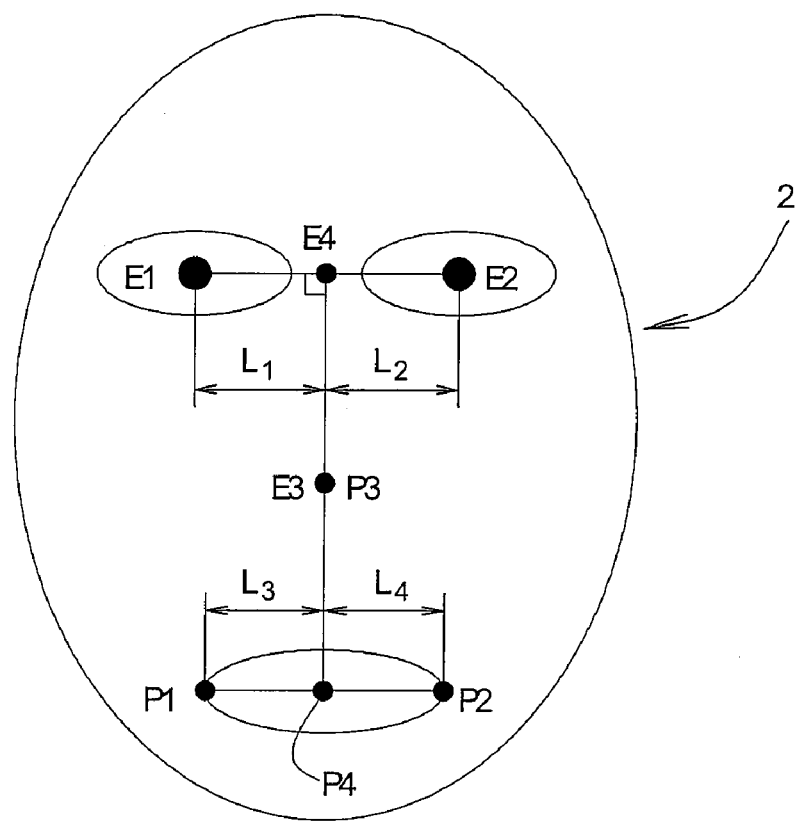
FIG. 5 is a schematic diagram to illustrate how a plurality of feature points on a face image are used to determine a head turning angle.

Referring to FIGS. 4 and 5, the head turning angle calculating module 111 retrieves a face image 2 from the first image database 110, and utilizes a plurality of feature points (such as pupils, lips, etc) on the face image 2 to determine a head turning angle (such as angle α in FIG. 3). E3 and P3 (at the same point) represent a point (i.e., the apex nasi) between the two nostrils of the driver 81. Supposing the pupil positions of the driver 81 are E1 and E2, respectively; and two corner positions of the lips of the driver 81 are P1, P2, respectively, a mid-point between the two nostril positions is the position of the apex nasi (i.e., E3 or P3). By drawing a perpendicular line from the apex nasi at E3 or P3 to line E1, E2, a nasion position E4 can be obtained, and by drawing another perpendicular line from the apex nasi at E3 or P3 to line P1, P2, a mid-lip position P4 can be obtained.

The principle behind the determination of the head turning angle α of the driver 81 in a preferred embodiment is based on the fact that a ratio of the two pupil positions E1 and E2 of the driver 81 to the nasion position E4 of the driver 81 will vary with a change in the head turning angle α. The head turning angle α is considered as the sight direction of the driver 81. Supposing $L_1$ and $L_2$ are distances of the pupil positions E1 and E1 to the nasion position E4, respectively, a pupil ratio $R_{EYE}$ can be calculated using the following Equation 1:

$$R_{EYE} = \text{sign}(L_1 - L_2) \frac{\min(L_2, L_1)}{\max(L_2, L_1)} \qquad \text{Equation 1}$$

A head turning angle lookup table can be generated based on different pupil ratios $R_{EYE}$ to help determine the head turning angle α of the driver 81.

Aside from the above method of calculation, in another embodiment, differences in ratio of the two corner positions P1 and P2 of the lips of the driver 81 to the mid-lip position P4 of the driver 81 can be used to determine the head turning angle α of the driver 81, and the head turning angle α is considered as the sight direction of the driver 81. Supposing $L_3$ and $L_4$ are distances from the two corner positions P1, P2 to the mid-lip position P4, respectively, a lip ratio $R_{LIP}$ can be calculated using the following Equation 2:

$$R_{LIP} = \text{sign}(L_3 - L_4) \frac{\min(L_4, L_3)}{\max(L_4, L_3)} \qquad \text{Equation 2}$$

In this preferred embodiment, the head turning angle α is determined by calculating the lip ratio $R_{LIP}$. After calculating the lip ratio $R_{LIP}$, the lip ratio $R_{LIP}$ is converted to the head turning angle α based on a predetermined lookup table as shown in Table 1 below.

TABLE 1

| Lip ratio $R_{LIP}$ | Sight direction | Head turning angle α |
| --- | --- | --- |
| From 1 to 0.7 | Left turn | From 0° to 12° |
| From 0.7 to 0.5 | Left turn | From 12° to 24° |
| From 0.5 to 0.3 | Left turn | From 24° to 36° |
| From 0.3 to 0 | Left turn | Greater than 36° |
| From −1 to −0.7 | Right turn | From 0° to 12° |
| From −0.7 to −0.5 | Right turn | From 12° to 24° |
| From −0.5 to −0.3 | Right turn | From 24° to 36° |
| From −0.3 to −0 | Right turn | Greater than 36° |

Referring to FIG. 4, after the head turning angle calculating module 111 has obtained the head turning angle α, the line-of-sight indicating module 112 will indicate the sight direction I'-I' of the driver 81 in the global coordinate space 7 according to the head turning angle α.

(II) Acquisition of the Mid-Line of Lane

Figure 6A:
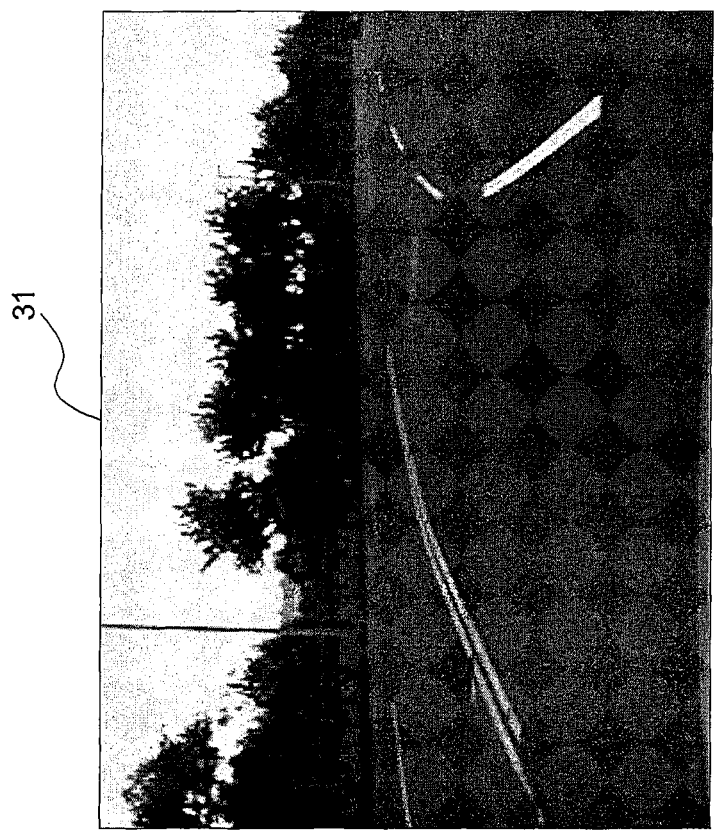

Referring to FIGS. 4, 6A and 6B, the edge detecting module 121 is used to retrieve a front lane image 31 from the second image database 120. The front lane image 31 is subjected to edge detection processing to obtain an edge detected image 32. The edge detected image 32 has a plurality of edge points.

Subsequently, the inverse perspective mapping module 122 performs inverse perspective mapping on the edge points of the edge detected image 32 so as to convert three-dimensional coordinate points to two-dimensional coordinate points and to map the two-dimensional coordinate points into the global coordinate space 7. The purpose of using inverse perspective mapping is to obtain a real coordinate space without a perspective effect.

The working principle behind the inverse perspective mapping module 122 is described below.

Perspective mapping in image processing is to project a point in a three-dimensional space to a two-dimensional plane. Since two straight lines which are originally parallel in a two-dimensional image plane will intersect at a vanishing point, inverse perspective mapping must be conducted to eliminate the perspective effect. Three spaces are first defined according to this principle:

W={x,y,z} ∈E³, indicating the three-dimensional space of the real world;
I={u,v} ∈E², indicating the two-dimensional space of an image; and
S={x,y,0} ∈W, indicating a remapped image, which is defined as a two-dimensional projection of the real space.

Figure 7A:
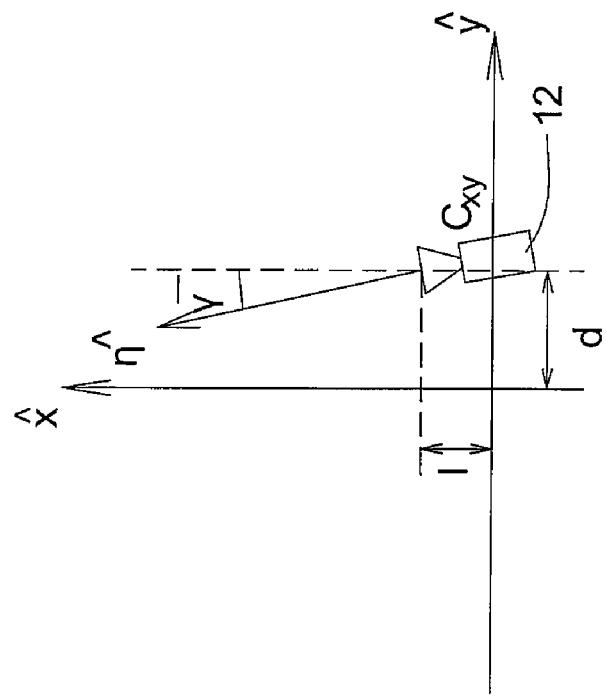
FIGS. 7A and 7B are schematic diagrams to illustrate mounting position of a second image capturing device of the preferred embodiment viewed from different angles.
Figure 7B:
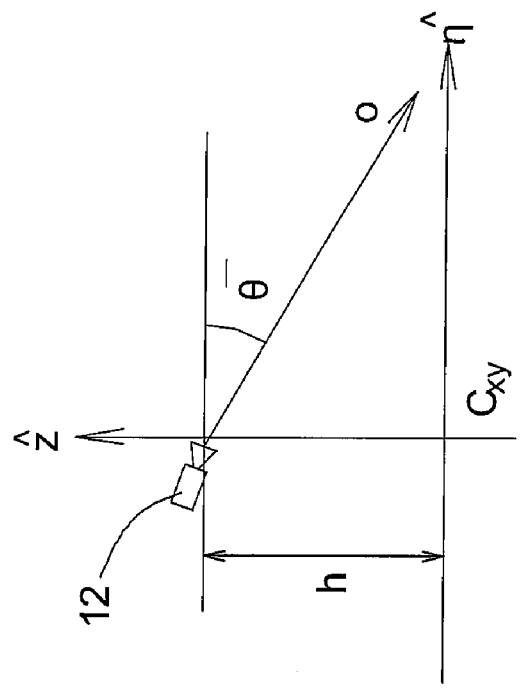

FIGS. 7A and 7B are top and side views to illustrate the mounting position of the second image capturing device 12. When inverse perspective mapping is to be performed, the following parameters need to be known:

Position of the second image capturing device 12: C=(l,d,h)∈W, where position C is defined by three parameters, which are h: camera height; l: distance from center of camera to lens; and d: distance from camera to horizontal point of origin.

For a shooting direction of the second image capturing device 12, an optical axis thereof is defined using the following angles: $\bar{\gamma}$ is the angle of deviation of the X-axis; and $\bar{\theta}$ is the angle of deviation of the Y-axis, i.e., the angle of depression. In addition, there are also other parameters, including aperture diameter, focal length, aperture, and resolution (picture resolution n×n), etc., of the second image capturing device 12.

The following inverse perspective mapping equations can be obtained using algebraic and trigonometric functions:

$$x(u, v) = h \times \cot\left[(\bar{\theta} - \alpha) + u\frac{2\alpha}{n-1}\right] \times \cos\left[(\bar{\gamma} - \alpha) + v\frac{2\alpha}{n-1}\right] + l \quad \text{Equation 3}$$

$$y(u, v) = h \times \cot\left[(\bar{\theta} - \alpha) + u\frac{2\alpha}{n-1}\right] \times \sin\left[(\bar{\gamma} - \alpha) + v\frac{2\alpha}{n-1}\right] + d \quad \text{Equation 4}$$

$$z(u, v) = 0 \quad \text{Equation 5}$$

Using equations 3, 4, and 5, it can be known that pixel position (x,y,0)∈S corresponds to pixel position (u,v)∈I. Hence, after computing each pixel of the edge points, two-dimensional coordinate points without perspective effect can be obtained.

Figure 8:
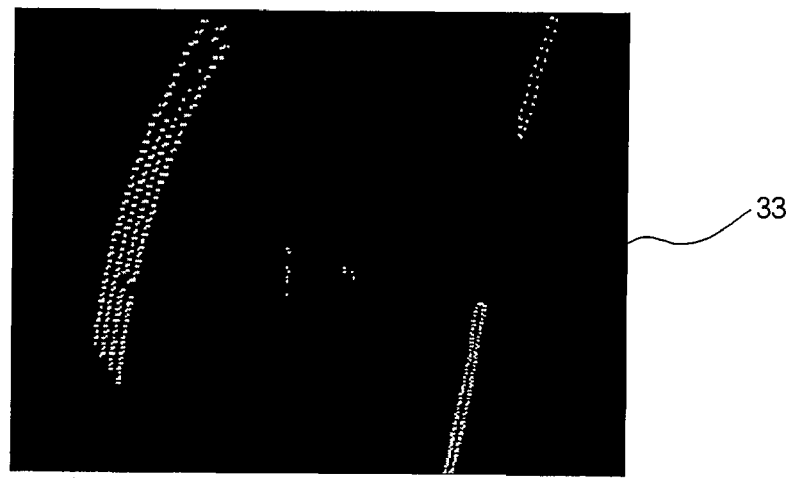
FIG. 8 is a schematic diagram to illustrate a perspective mapping image obtained by subjecting the edge detected image to inverse perspective mapping.

Referring to FIGS. 6A and 6B, in this embodiment, the edge detected image 32 is obtained by edge-detection processing of a source image, i.e., the front lane image 31. The edge detected image 32 is converted into a perspective mapped image 33, as shown in FIG. 8, via inverse perspective mapping.

Referring again to FIG. 3, the morphology computation module 123 uses morphological operators, such as dilation, erosion, opening, closing, etc., to enhance the effect of subsequent straight line detection. The straight line detecting module 124 uses a straight line detection scheme of a Hough transform to obtain actual lane edge lines based on a region that possibly has lane edge lines.

The working principle of the straight line detecting module 124 is to detect straight lines formed by the two-dimensional coordinate points after inverse perspective mapping. The Hough transform is employed in this preferred embodiment.

The Hough transform is a common scheme primarily used to detect certain specific shapes (e.g., straight lines, circles, and ellipses) in an image. According to the Hough transform, point (X,Y) on a straight line in a Cartesian coordinate system is mapped into a space (ρ, θ) using the following Equation 6:

$$\rho = X\cos\theta + Y\sin\theta \quad \text{Equation 6}$$

Referring to FIG. 9A, a straight line $L_a$ as shown therein is used for purposes of illustration. A line normal to the straight line $L_a$ intersects the origin (0,0), forms an angle $\theta_0$ with a horizontal axis X, and has a length $\rho_0$. For any arbitrary straight line, the two variables, length $\rho_0$ and angle $\theta_0$, can be denoted as ρ and θ, which respectively represent length and direction of a vector from the origin to the straight line $L_a$. Mapping according to the Hough transform can be in two directions, from (X,Y) to (ρ, θ), and from (ρ, θ) to (X,Y). (X, Y) is represented as two coordinate points on the straight line $L_a$ by $(X_1, Y_1)$ and $(X_2, Y_2)$.

As shown in FIG. 9B, for the mapping from (X,Y) to (ρ, θ), point $(X_0, Y_0)$ in the X-Y plane will be mapped into a sinusoidal curve in the ρ-θ plane. The mapping equation is shown in the following Equation 7:

$$\rho = X_0\cos\theta + Y_0\sin\theta = A\sin(\theta + \theta_0) \quad \text{Equation 7}$$

$$\text{where } \theta_0 = \tan^{-1}\frac{X_0}{Y_0},$$

$$A = \sqrt{(X_0^2 + Y_0^2)}, \quad 0 \leq \theta \leq 2\pi.$$

In Equation 7, the initial angle $\theta_0$ and amplitude A vary with the values of $X_0$ and $Y_0$. Likewise, for the mapping from $(\rho, \theta)$ to $(x, y)$ according to the Hough transform, a straight line in the X-Y plane will be mapped into a point in the $\rho$-$\theta$ plane. The Hough transform linear algorithm for detecting straight lines is briefly discussed as follows.

(1) An image of an object is binarized, with 0 representing background and 1 representing a set of points in the object.

(2) An accumulator array H $(\rho, \theta)$ is constructed. Every point $(Xi, Yi)$ in the binarized image which is represented by 1 is transformed into $(\rho, \theta)$, i.e., finding all the points $(\rho, \theta)$ in the array H $(\rho, \theta)$ which satisfy the mapping equation, $\rho = X_i \cos \theta + Y_i \sin \theta$, and H $(\rho, \theta)$ is made to be equal to H $(\rho, \theta)+1$.

(3) The accumulator array H $(\rho, \theta)$ is inspected. A value within H $(\rho, \theta)$ represents the number of points on a straight line which is confirmed by $(\rho, \theta)$, and a threshold value is given as a lower limit so as to find a point in the array H $(\rho, \theta)$ which is greater than the threshold value, thereby obtaining various parameters of the straight line to be detected.

Many straight lines may be detected after applying the Hough transform to each image. Through length and slope limitations, a line segment that most probably is a lane edge line is obtained to serve as detection result of a final lane edge line.

Figure 10C:
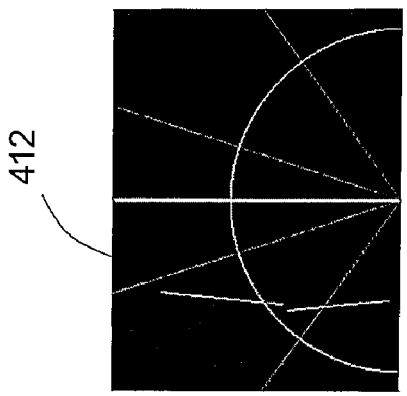
FIGS. 10A, 10B and 10C are schematic views to illustrate detection of a straight lane edge line.
Figure 10B:
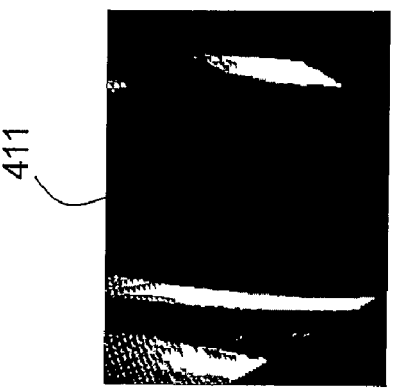
Figure 10A:
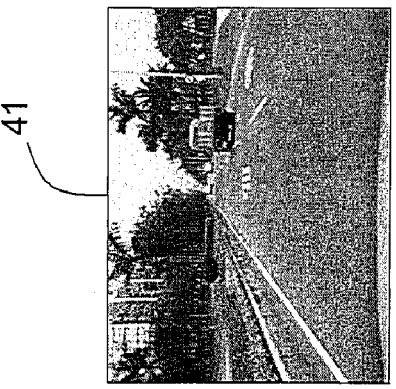
Figure 11A:
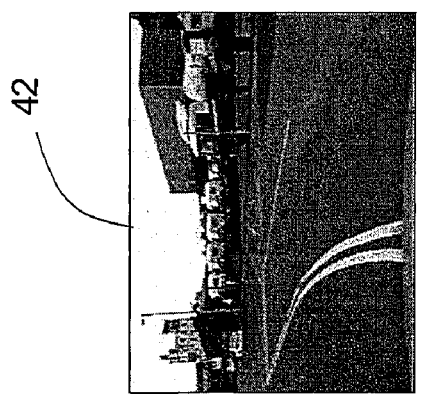
FIGS. 11A, 11B and 11C are schematic views to illustrate detection of a curved lane edge line.
Figure 11B:
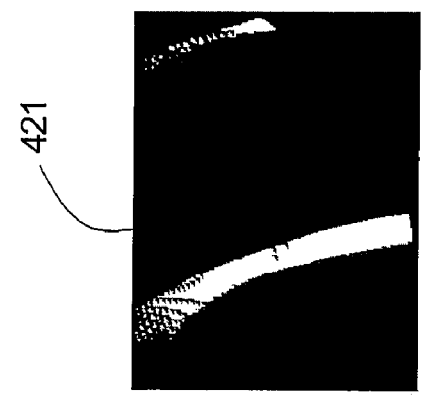
Figure 11C:
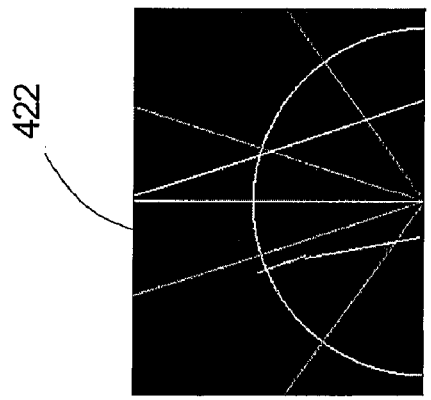

FIGS. 10A, 10B, 10C and FIGS. 11A, 11B, and 11C respectively illustrate detection of a straight lane edge line and a curved lane edge line. FIG. 10A and FIG. 11A respectively show a source lane image 41 and a source lane image 42. FIG. 10B and FIG. 11B respectively show lane edge lines that can be obtained from edge detected images 411 and 421. In lane edge line images 412 and 422 shown respectively in FIG. 10C and FIG. 11C, the gray lines are straight lines that were detected using the Hough transform.

Referring to FIG. 4, from the straight lines obtained by the straight line detecting module 124 using the Hough transform, and according to a set length, a set slope, or a set distance from the driving direction, the mid-line of lane indicating module 125 selects two straight lines that most probably are the two lane edge lines on the left and right sides of the vehicle 8. Subsequently, according to a middle line between the two edge lines thus obtained, a lane middle line is marked to serve as a basis for the mid-line of lane. Finally, the driving direction III'-III' is marked in the global coordinate space 7.

(III) Obtaining Driver Correlation Coefficient $C_{Driver}$, Lane Correlation Coefficient $C_{Lane}$, and Driving Danger Coefficient $C_{Danger}$ Referring to FIGS. 4 and 1, the driver correlation coefficient computing module 141 receives driving direction information outputted by the driving direction indicating module 130 and the driver's sight direction information outputted by the line-of-sight indicating module 112, and calculates a driver correlation coefficient $C_{Driver}$ according to information of the mid-line of lane and the sight direction to serve as a basis for determining a degree of deviation of the line-of-sight of the driver 81 from the current lane 9.

In addition, the lane correlation coefficient computing module 131 receives the driving direction information outputted by the driving direction indicating module 130 and the mid-line of lane information outputted by the mid-line of lane indicating module 125, and calculates a lane correlation coefficient $C_{Lane}$ according to the information of the driving direction and the mid-line of lane to serve as a basis for determining a degree of deviation of the vehicle 8 from the current lane 9.

The danger coefficient computing module 151 receives the lane correlation coefficient $C_{Lane}$ and the driver correlation coefficient $C_{Driver}$, and multiplies the lane correlation coefficient $C_{Lane}$ by the driver correlation coefficient $C_{Driver}$ so as to compute a driving danger coefficient $C_{Danger}$. An equation therefore is defined as follows:

$$C_{Danger} = C_{Lane} \times C_{Driver} \qquad \text{Equation 8}$$

In this preferred embodiment, soft shape context is primarily used to calculate the driver correlation coefficient $C_{Driver}$ and the lane correlation coefficient $C_{Lane}$.

Shape context is a scheme used to measure shape similarities, in which a space occupied by an object is partitioned into a plurality of bins. Order of the bins is marked according to a predetermined order. In the space partitioned into the bins, a current number of shape points in each bin is calculated, and a shape histogram is constructed according to the order of the bins. Therefore, when given two objects, two shape histograms are generated. The following Equation 9 is used to calculate the correlation coefficient:

$$C_{ij} = \frac{1}{2} \sum_{k=1}^{T} \frac{[h_i(k) - h_j(k)]^2}{h_i(k) + h_j(k)} \qquad \text{Equation 9}$$

where i is a first object, j is a second object, T is total number of bins, $h_i(k)$ is the kth bin of the first object, and $h_j(k)$ is the kth bin of the second object.

When calculating the number of shape points in each bin in the soft shape context, the point number is dispersed according to a weight value thereof to a neighboring bin so as to reduce sensitivity of shape points on the border of the bin.

Figure 12C:
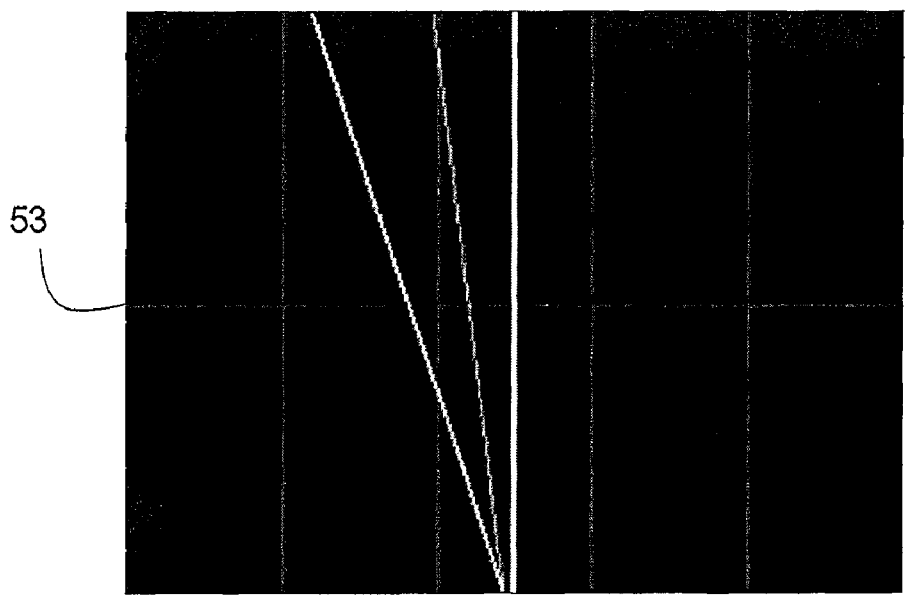

Referring to FIGS. 12A to 12C, in this preferred embodiment, a driver image 51 and a front lane image 52 are inputted into the system of the present invention for computation and processing. A global coordinate plot 53 is divided into ten bins (indicated by blue lines). FIG. 12A shows the driver image 51. FIG. 12B shows the front lane image 52. FIG. 12C shows the global coordinate plot 53. In the outputted result, the white line is the driving direction line, the green line is the driver's sight direction line, and the red line is the mid-line of lane. The driver correlation coefficient $C_{Driver}$ is calculated to be 236.43, the lane correlation coefficient $C_{Lane}$ is calculated to be 5.54, and the driving danger coefficient $C_{Danger}$ is the product of the lane correlation coefficient $C_{Lane}$ and the driver correlation coefficient $C_{Driver}$.

Referring back to FIG. 4, the driving mode output module 163 has empirical or threshold values of different degrees set therein, and is used to receive the driving danger coefficient $C_{Danger}$ and classify the driving status of the driver 81 as a safe mode, a risky mode or a dangerous mode according to size of the driving danger coefficient $C_{Danger}$.

TABLE 2

|  | Driving danger coefficient $C_{Danger}$ |
|---|---|
| Safe mode | Below <3000 |
| Risky mode | Between 3000-24000 |
| Dangerous mode | >24000 |

Since the number and shape of the bins used for calculation in soft shape context will affect the size of the driving danger coefficient $C_{Danger}$, and since the user is allowed to adjust the number of mode types and the ranges of the coefficients, the present invention should not be limited to the content of Table 2.

The model determining module 133 retrieves previous lane correlation coefficients $C_{Lane}$ for a previous time interval from the lane correlation coefficient database 132 in advance. The distribution characteristics of the previous lane correlation coefficients $C_{Lane}$ are used to train a built-in hidden Markov model for recognizing driving modes. Thereafter, using the current lane correlation coefficient $C_{Lane}$ for computation, the current road situation can be identified to be a straight lane, a curved lane, a bend, or a lane change. Finally, the computation result is outputted from the road situation output module 162 to the indicating device 14.

FIGS. 13A to 13D illustrate the distribution of the lane correlation coefficients $C_{Lane}$ for the four road situations mentioned above.

FIG. 13A is a lane correlation coefficient $C_{Lane}$ distribution diagram for driving on a straight lane. It can be observed that most of the values of the lane correlation coefficients $C_{Lane}$ are very small, and are less than 60 in this preferred embodiment.

FIG. 13B is a lane correlation coefficient $C_{Lane}$ distribution diagram for driving from a straight lane to a curved lane. It can be observed that when the vehicle 8 drives into a curved lane, most of the values of the lane correlation coefficients $C_{Lane}$ are maintained within a certain range, which is between 60 and 150 in this preferred embodiment.

FIG. 13C is a lane correlation coefficient $C_{Lane}$ distribution diagram when the vehicle 8 changes lanes. It can be observed that the original lane correlation coefficient $C_{Lane}$ is maintained at a very small value and that the value of the lane correlation coefficient $C_{Lane}$ abruptly increases when the vehicle 8 changes to another lane and then abruptly decreases when the vehicle 8 is driving steadily in the changed lane. In this preferred embodiment, the lane correlation coefficient $C_{Lane}$ will increase abruptly to over 200 when the vehicle 8 changes to another lane.

FIG. 13D is a lane correlation coefficient $C_{Lane}$ distribution diagram for a curved lane. It can be observed that, when the vehicle 8 makes a turn, since there is not any lane path line on the road, no lane correlation coefficient $C_{Lane}$ is available. In this preferred embodiment, when a lane path line cannot be detected, a negative value is given. Therefore, when the lane correlation coefficient $C_{Lane}$ remains a negative value for a period of time, it is very probable that the vehicle 8 is making a turn.

Therefore, the distribution characteristics of the lane correlation coefficients $C_{Lane}$ are used as empirical or threshold values to train the hidden Markov model in advance, and the trained hidden Markov model is subsequently used to input the current lane correlation coefficient $C_{Lane}$ to identify the current road situation.

Figure 14A:
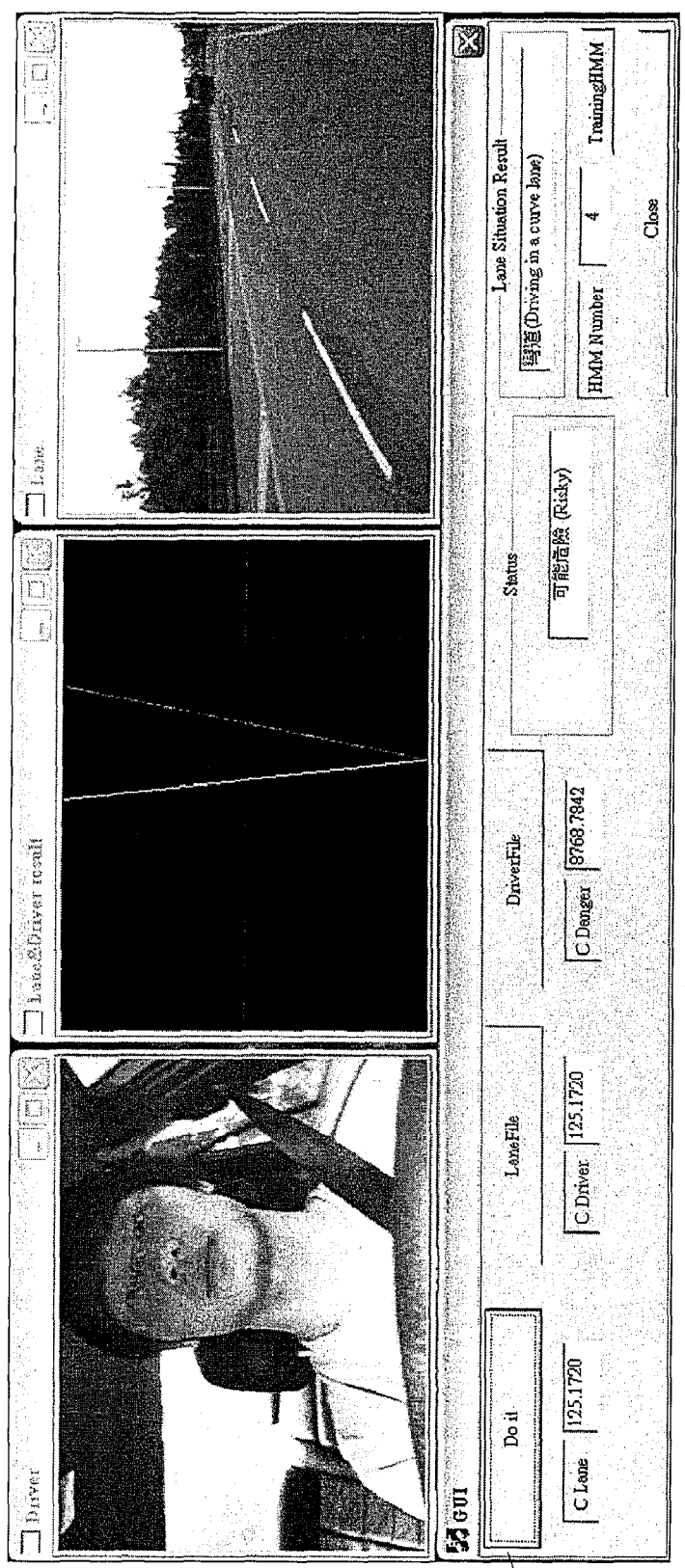
FIGS. 14A, 14B and 14C are schematic diagrams to illustrate test results obtained for different road situations.
Figure 14B:
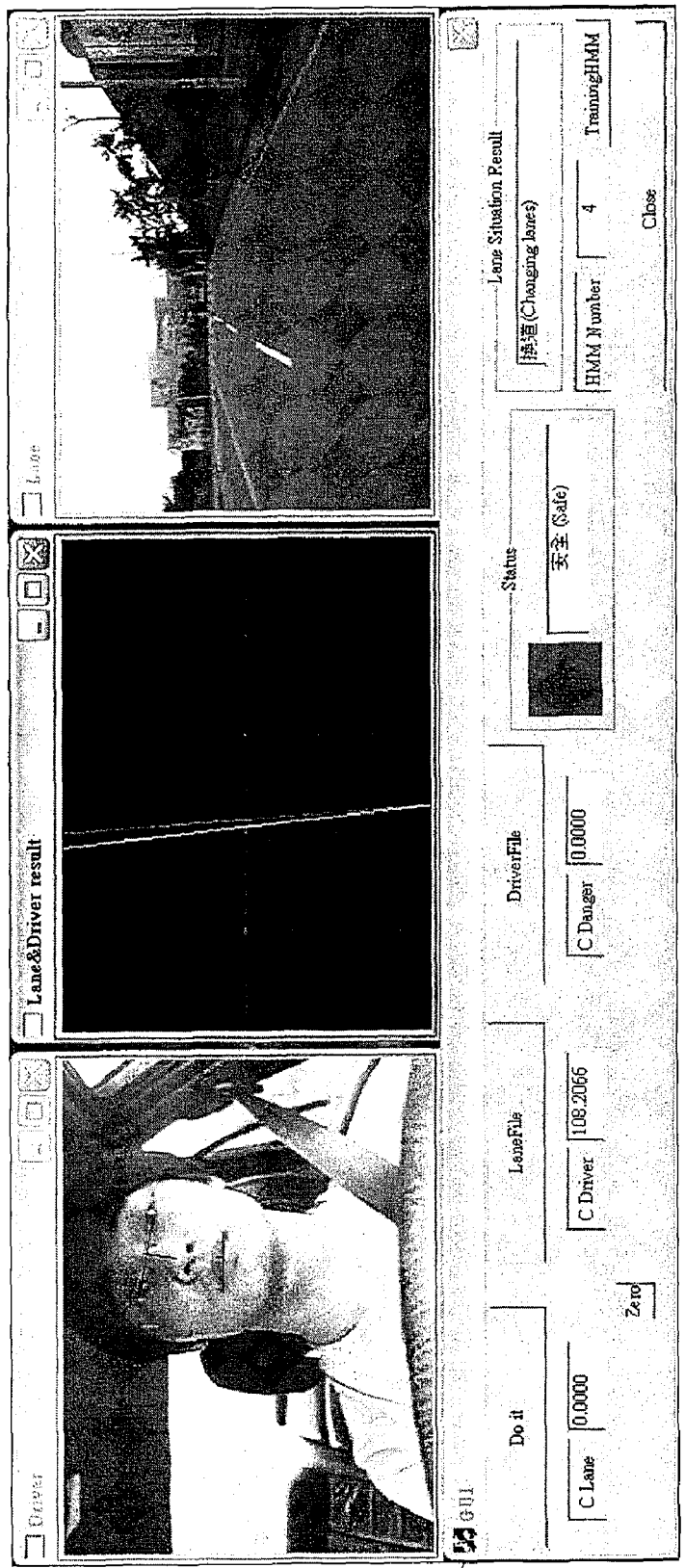
Figure 14C:
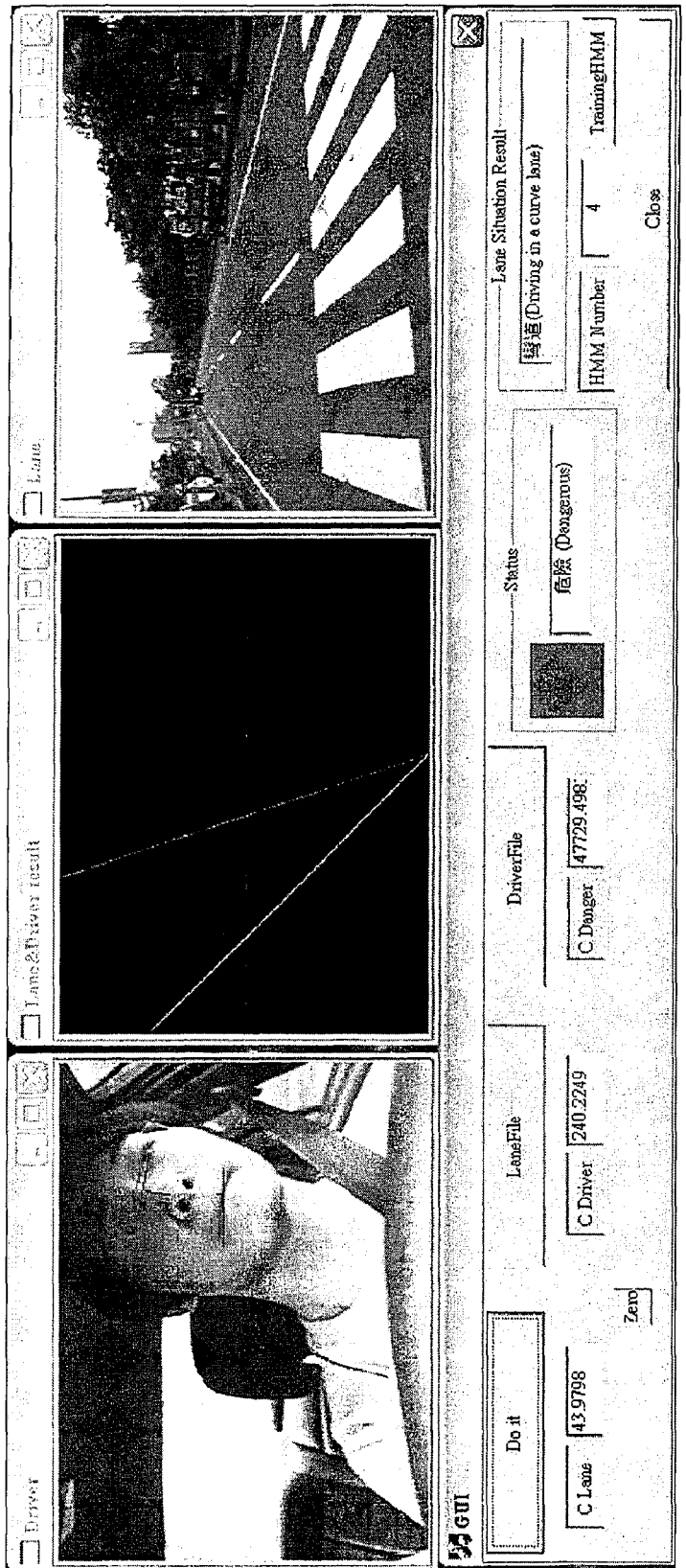

Reference is made to FIG. 1 in combination with FIGS. 14A to 14C that show the test results obtained for different road situations and different degrees of driver attention. As shown in FIG. 14A, when the vehicle 8 drives along a curved lane, since the driver 81 is not looking in the direction of the curved lane, the result shown on a test screen 61 is "risky mode." As shown in FIG. 14B, when the vehicle 8 changes lanes and the driver 81 is looking in the changing direction, the result shown on a test screen 62 is "safe mode." As shown in FIG. 14C, when the vehicle 8 has turned left and is about to traverse a crosswalk into another lane, since the driver 81 is looking in several directions to make sure that there are no pedestrians or cars coming in the opposite direction, the sight direction I-I, the mid-line of lane II-II, and the driving direction III'-III' are not in accord. Therefore, the result shown on a test screen 63 is "dangerous mode," in order to warn the driver 81 to be careful.

In sum, the intelligent driving safety monitoring system and method that integrate multiple direction information according to the present invention provide the following levels of application for the driver's reference:

1. Information of the driver's sight direction I-I, the mid-line of lane II-II, and the driving direction III'-III' is integrated before output to the indicating device 14, such as a display screen, for the driver 81 to view the current driving status;

2. Multiple direction information, such as the lane correlation coefficient $C_{Lane}$, the driver correlation coefficient $C_{Driver}$, or the driving danger coefficient $C_{Danger}$ calculated from the lane correlation coefficient $C_{Lane}$ and the driver correlation coefficient $C_{Driver}$, can be computed. The driving status of the driver 81 is further determined to be a safe mode, a risky mode or a dangerous mode according to the coefficients.

3. According to the lane correlation coefficient $C_{Lane}$, the current road situation can be determined to be a straight lane, a curved lane, a bend, or a lane change.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An intelligent driving safety monitoring system capable of integrating multiple direction information, said intelligent driving safety monitoring system being adapted to be installed in a vehicle and comprising:
    a first image capturing device for capturing a face image of a driver of the vehicle;
    a second image capturing device for capturing a front lane image of a portion of a lane ahead of the vehicle;
    a data processing device connected electrically to said first and second image capturing devices, and after computing based on the face image of the driver and the front lane image, mapping a sight direction of the driver and a mid-line of lane into a global coordinate space and integrating the single direction and the mid-line of lane into multiple direction information; and
    an indicating device connected electrically to said data processing device for outputting the multiple direction information to the driver for suggesting whether driving status of the driver is safe.

2. The intelligent driving safety monitoring system according to claim 1, wherein said second image capturing device is disposed in a driving direction that is defined by the vehicle and that is mapped into the global coordinate space.

3. The intelligent driving safety monitoring system according to claim 2, wherein said data processing device calculates a lane correlation coefficient $C_{Lane}$ based on information of the mid-line of lane and the driving direction in the global coordinate space to serve as a degree of deviation of the vehicle from a current lane.

4. The intelligent driving safety monitoring system according to claim 3, wherein said data processing device calculates a driver correlation coefficient $C_{Driver}$ based on information of the mid-line of lane and the sight direction of the driver in the global coordinate space to serve as a basis for determining awareness of the driver of changes in road situations.

5. The intelligent driving safety monitoring system according to claim 4, wherein said data processing device utilizes a soft shape context to calculate the lane correlation coefficient $C_{Lane}$ and the driver correlation coefficient $C_{Driver}$.

6. The intelligent driving safety monitoring system according to claim 4, wherein said data processing device calculates a driving danger coefficient $C_{Danger}$ by multiplying the lane correlation coefficient $C_{Lane}$ by the driver correlation coefficient $C_{Driver}$, an equation therefore being defined as follows:

$$C_{Danger} = C_{Lane} \times C_{Driver}.$$

7. The intelligent driving safety monitoring system according to claim 6, wherein said data processing device classifies the driving status of the driver as one of a safe mode, a risky mode and a dangerous mode according to size of the driving danger coefficient $C_{Danger}$.

8. The intelligent driving safety monitoring system according to claim 3, wherein said data processing device includes:
- a model computing module which obtains in advance previous lane correlation coefficients $C_{Lane}$ acquired within a previous time interval and which uses distribution characteristics of the previous lane correlation coefficients $C_{Lane}$ to train a hidden Markov model for recognizing a driving mode; and
- a road situation output module for obtaining a current lane correlation coefficient $C_{Lane}$, and for inputting the current lane correlation coefficient $C_{Lane}$ into the hidden Markov model for identifying whether a current road situation is one of a straight lane, a curved lane, a bend, and a lane change.

9. The intelligent driving safety monitoring system according to claim 1, wherein said data processing device includes:
- a head turning angle calculating module for determining a head turning angle based on a plurality of feature points on the face image; and
- a line-of-sight indicating module for indicating the sight direction of the driver in the global coordinate space based on the head turning angle.

10. The intelligent driving safety monitoring system according to claim 9, wherein said head turning angle calculating module calculates a lip ratio according to the following equation:

$$R_{LIP} = \text{sign}(L_3 - L_4) \frac{\min(L_4, L_3)}{\max(L_4, L_3)},$$

where $L_3$ and $L_4$ are distances from two corner positions of the lips of the driver to a mid-lip position of the driver, and the lip ratio $R_{LIP}$ thus calculated is converted to the head turning angle through table lookup.

11. The intelligent driving safety monitoring system according to claim 1, wherein said data processing device includes:
- an edge detecting module for obtaining a plurality of edge points on the front lane image; and
- an inverse perspective mapping module for performing inverse perspective mapping on the edge points so as to convert three-dimensional coordinate points into two-dimensional coordinate points and for mapping the two-dimensional coordinate points into the global coordinate space.

12. The intelligent driving safety monitoring system according to claim 11, wherein said data processing device further includes:
- a morphology computation module for computing the edge points using a morphological operator that is one of dilation, erosion, opening and closing.

13. The system according to claim 11, wherein said data processing device further includes:
- a straight line detecting module for detecting straight lines formed by the two-dimensional coordinate points; and
- a mid-line of lane indicating module for selecting two of the detected straight lines which most probably are two lane edge lines on left and right sides of the vehicle according to one of a set length, a set slope and a set distance from the driving direction, and for marking the mid-line of lane based on a middle line between the two lane edge lines.

14. The intelligent driving safety monitoring system according to claim 13, wherein said straight line detecting module employs a Hough transform to compute and detect the straight lines.

15. The intelligent driving safety monitoring system according to claim 1, wherein said indicating device is one of a display device and an alarm device.

16. An intelligent driving safety monitoring method integrating multiple direction information, the intelligent driving safety monitoring method being adapted for use in a vehicle and comprising the following steps:
  (a) capturing a face image of a driver of the vehicle;
  (b) capturing a front lane image of a portion of a lane ahead of the vehicle;
  (c) after computing the face image of the driver and the front lane image, mapping a sight direction of the driver and a mid-line of lane into a global coordinate space and integrating the sight direction and the mid-line of lane into multiple direction information; and
  (d) providing the multiple direction information to the driver for suggesting whether driving status of the driver is safe.

17. The intelligent driving safety monitoring method according to claim 16, wherein, in step (c), the vehicle defines a driving direction that is mapped into the global coordinate space.

18. The intelligent driving safety monitoring method according to claim 17, wherein, in step (c), a lane correlation coefficient $C_{Lane}$ is calculated based on information of the mid-line of lane and the driving direction in the global coordinate space to serve as a degree of deviation of the vehicle from a current lane.

19. The intelligent driving safety monitoring method according to claim 18, wherein, in step (c), a driver correlation coefficient $C_{Driver}$ is calculated based on information of the mid-line of lane and the sight direction of the driver in the global coordinate space to serve as a basis for determining awareness of the driver of changes in road situations.

20. The intelligent driving safety monitoring method according to claim 19, wherein, in step (c), a soft shape context is used to calculate the lane correlation coefficient $C_{Lane}$ and the driver correlation coefficient $C_{Driver}$.

21. The intelligent driving safety monitoring method according to claim 19, wherein, in step (c), the lane correlation coefficient $C_{Lane}$ is multiplied by the driver correlation coefficient $C_{Driver}$ to calculate a driving danger coefficient $C_{Danger}$, an equation therefore being defined as follows:

$$C_{Danger} = C_{Lane} \times C_{Driver}.$$

22. The intelligent driving safety monitoring method according to claim 21, wherein, instep (c), the driving status of the driver is classified as one of a safe mode, a risky mode and a dangerous mode according to size of the driving danger coefficient $C_{Danger}$.

23. The intelligent driving safety monitoring method according to claim 18, wherein step (c) includes the following sub-steps:

(c-8) acquiring previous lane correlation coefficients $C_{Lane}$ within a previous time interval in advance, and using distribution characteristics of the previous lane correlation coefficients $C_{Lane}$ to train a model determining module for recognizing a driving mode; and (c-9) acquiring a current lane correlation coefficient $C_{Lane}$ and inputting the current lane correlation coefficient $C_{Lane}$ into the model determining module to identify whether a current road situation is one of a straight lane, a curved lane, a bend, and a lane change.

24. The intelligent driving safety monitoring method according to claim 23, wherein the model determining model has a built-in hidden Markov model.

25. The intelligent driving safety monitoring method according to claim 16, wherein step (c) includes the following sub-steps:

(c-1) determining a head turning angle based on a plurality of feature points on the face image; and (c-2) indicating the sight direction of the driver in the global coordinate space according to the head turning angle.

26. The intelligent driving safety monitoring method according to claim 25, wherein a lip ratio is calculated in step (c-1) according to the following equation:

$$R_{LIP} = \text{sign}(L_3 - L_4) \frac{\min(L_4, L_3)}{\max(L_4, L_3)},$$

the lip ratio $R_{LIP}$ thus calculated is converted to the head turning angle based on a predetermined lookup table.

27. The intelligent driving safety monitoring method according to claim 16, wherein step (c) includes the following sub-steps:

(c-3) acquiring a plurality of edge points on the front lane image; and (c-4) subjecting the edge points to inverse perspective mapping so as to convert three-dimensional coordinate points into two-dimensional coordinate points, and mapping the two-dimensional coordinate points into the global coordinate space.

28. The intelligent driving safety monitoring method according to claim 27, wherein step (c) further includes the following sub-step:

(c-5) computing the edge points using a morphological operator which is one of dilation, erosion, opening and closing.

29. The intelligent driving safety monitoring method according to claim 27, wherein step (c) includes the following sub-steps:

(c-6) detecting straight lines formed by the two-dimensional coordinate points; and (c-7) selecting two straight lines from the detected straight lines which most probably are two lane edge lines on left and right sides of the vehicle according to one of a set length, a set slope, and a set distance from the driving direction, and marking the mid-line of lane based on a middle line between the two lane edge lines.

30. The intelligent driving safety monitoring method according to claim 29, wherein, in step (c-6), a Hough transform is employed to detect the straight lines.

* * * * *